United States Patent [19]

Roth

[11] 4,361,610
[45] Nov. 30, 1982

[54] NON-SKID CARPET PROTECTOR

[75] Inventor: David W. Roth, Detroit, Mich.

[73] Assignee: The 2500 Corporation, Lathrup Village, Mich.

[21] Appl. No.: 131,262

[22] Filed: Mar. 17, 1980

[51] Int. Cl.³ .............................. B32B 3/06; B60J 9/00
[52] U.S. Cl. ...................................... 428/95; 296/1 F; 428/192
[58] Field of Search ....................... 428/31, 85, 88, 90, 428/91, 167, 192, 95; 15/215–217, 238; 296/1 F; D12/203; 4/582; 16/1

[56] References Cited

U.S. PATENT DOCUMENTS

| 80,379 | 7/1868 | Young | 15/217 |
| 977,789 | 12/1910 | Donovan | 15/217 |
| 2,292,103 | 8/1942 | Cotterman | 15/217 |
| 3,488,081 | 1/1970 | Nolen | 296/1 F |
| 3,930,084 | 12/1975 | Shields | 296/1 F |

Primary Examiner—Paul J. Thibodeau
Attorney, Agent, or Firm—Dolgorukov & Dolgorukov

[57] ABSTRACT

The specification discloses a non-skid carpet protector which has numerous stiff bristles placed on the underside thereof to prevent movement upon the entry and existing of occupants of a motor vehicle.

Two modifications of the invention are disclosed by applicant, i.e. a non-skid carpet protector which covers only a limited area of the horizontal part of the motor vehicle passenger compartment floor, near the vehicle's brake and accelerator, and a non-skid carpet protector which covers a substantial portion of both the horizontal and vertically inclined portion of the floor of the motor vehicle passenger compartment.

The non-skid carpet protector is specifically designed so that it may be easily secured to the floor carpet within a motor vehicle, by the application of a vertical pressure on top of said non-skid carpet protector, thus causing the stiff bristles to effectively engage in a frictional relationship the underlying carpet to be protected.

5 Claims, 3 Drawing Figures

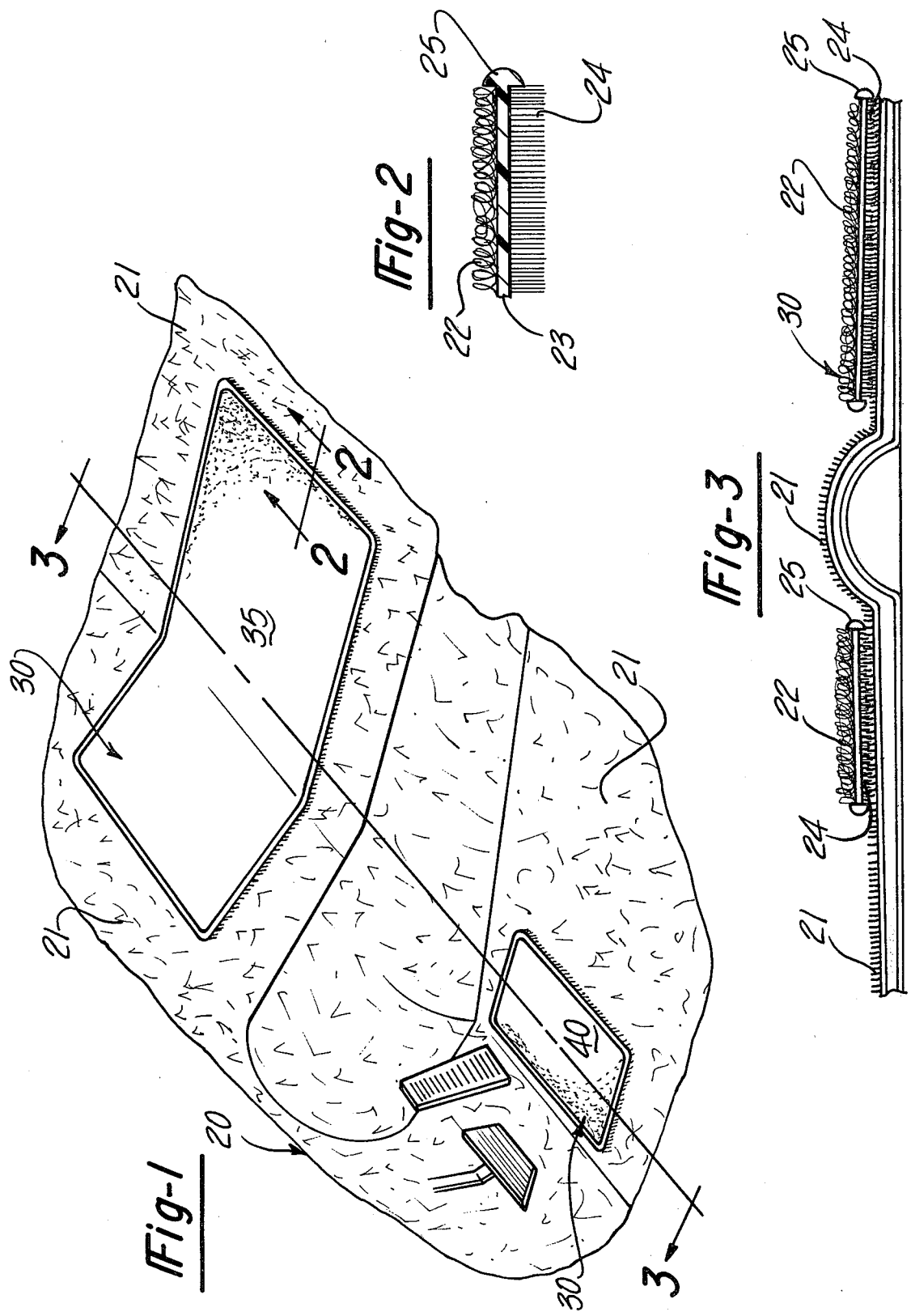

NON-SKID CARPET PROTECTOR

The present invention relates to a non-skid vehicle floor mat, and more specifically to an improved non-skid carpet protector. The disclosed device answers a long felt need for an economical and effective carpet protector which will remain in place during the entry and exiting of occupants of a motor vehicle.

A review of the prior art will indicate that there are many patents which relate to the use of removable vehicle floor mats, to protect the underlying carpet area, but to the best of my knowledge, none of these have had any commerical success or acceptability by the retail consumers or business community, nor have any of these carpet protectors solved the problems associated with carpet movement during vehicle entry and exit, in a similar to that disclosed by the use of specially designed stiff bristles on the underside of a carpet protector.

Thus, one of the objects of the present invention is to provide a non-skid carpet protector which will remain in place during entry and exit of occupants of a motor vehicle.

A further object of the present invention is to provide a non-skid carpet protector which is easily removable and replaceable on the floor of a motor vehicle.

A further object of the present invention is to provide a non-skid carpet protector which is economical.

A further object of the present invention is to provide a non-skid carpet protector which is capable of being used on any carpeted surface.

Still another object of the present invention is to provide a non-skid carpet protector of a simple and practical construction, which is neat and attractive in appearance.

Another object of the present invention is to provide a non-skid carpet protector which is securely engaged to the underlying carpet by the application of a vertical pressure upon its horizontal surface.

Still another object of the present invention is to provide a non-skid carpet protector which can be made to any shape or size.

Further objects and advantages of this invention will be apparent from the following description and appended claims, reference being made to the accompanying drawings forming a part of this specification, wherein like reference characters designate corresponding parts in the several views.

BRIEF DESCRIPTION OF THE DRAWINGS

FIG. 1 is a perspective view showing the interior front floor of a motor vehicle on which is disposed a non-skid carpet protector embodying my present invention.

FIG. 2 is a partial cross sectional view of my non-skid carpet protector taken in the direction of the arrows along the section line 2—2 of FIG. 1.

FIG. 3 is a cross sectional view of the front motor vehicle compartment taken in the direction of the arrows along the section line 3—3 of FIG. 1.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for purpose of description and not of limitation.

DESCRIPTION OF THE PREFERRED EMBODIMENT

Referring to FIG. 1, there is shown a perspective view of an interior of a motor vehicle generally designated by numeral 20, upon which is disposed the preferred embodiment of my non-skid carpet protector generally designated by numeral 30.

The non-skid carpet protector 30 will remain securely in place during the entry and exit by the vehicle occupants without the use of any screws, hooks or other mechanical securing means, due to the specially designed and improved features of my present invention which utilize stiff bristles 24 on the underside thereof, as can be best seen in FIGS. 2 and 3.

In FIG. 2, which is a cross sectional view of my non-skid carpet protector 30, there is disclosed what would appear at first glance to be a conventional-type carpeted floor mat with the carpet cover material 22 attached by means well known in the art, to the carpet backing 23. However, on the bottom of the carpet backing 23 numerous stiff bristles 24 are permanently attached, also by means well known within the art of rug manufacturing. Such attaching means, of course, will vary depending on what carpet cover material, backing and bristles are used, but should be strong and water resistant.

Around the perimeter of the non-skid carpet protector 30 is placed a rivet-type edge treatment 25 which protects the exposed edges of both the carpet cover material 22 and the stiff bristles 24.

Applicant refers to his edge treatment 25 as a rivet-type edge treatment because of the fact that, as shown in FIG. 2, the cross section of the edge treatment is in the shape of a rivet head.

It should be understood that while the preferred embodiment of my invention utilizes a carpet backing 23, it is well within the scope of the present invention to use any practicable substrate in place of backing 23, depending on the use my protector 30 is intended for. Similarly the carpet cover material 22 may be substituted by another material depending on the intended application.

In any event, the spacing of the stiff bristles 24 should be such that the space between bristles is capable of accommodating the insertion of motor vehcile floor carpet 21 between it in a frictional mesh-type arrangement which is best seen in FIG. 3. I have found that the best length for the stiff bristles 24 is no more than $\frac{3}{4}$ of the average length of the carpet cover material, so that the floatation and resulting slippage of non-skid carpet protector 30 is prohibited.

While the stiff bristles 24 may be made from any kind of material, I have found the use of boar bristles or plastic to be extremely desirable since they can be obtained in several varieties of quality depending on the length, color and straightness of the bristle desired. The boar bristles are preferred on thinner carpet where extra gripping is needed while plastic bristles are thought sufficient for thick carpets. When plastic bristles are used they may be formed integrally with the backing 23.

Thus, it can be readily seen that upon the entry of a passenger to the motor vehicle and the application of a vertical pressure upon the surface of the non-skid carpet protector 30, the stiff bristles 24 are placed in frictional contact with the fibers of the motor vehicle floor carpet 21 so that the displacement of non-skid carpet protector 30 in a horizontal direction is prohibited.

While I have described and shown my invention as being used in the front of a motor vehicle with two modifications, it should be understood that it is well within the scope of the present invention that my device be used in either the front or rear of a motor vehicle, or be constructed to any shape or size necessary to protect the underlying carpet.

Also, by the substitution of the carpet material 22 and/or the carpet backing 23 with other suitable materials, depending on the intended application, a protective device for many purposes is provided.

Thus, by abandoning the previous construction of carpet protectors, I have invented a protective device which is simple, practical, economical and attractive in appearance which solves the problem of movement of the carpet protector upon the entry and exiting of the occupants of a motor vehicle.

I claim:

1. A non-skid carpet protector adapted to be used on vehicle carpets including, in combination, a carpet backing of a desired shape and cross section, a separate layer of covering material of a complimentary shape attached to the top of said carpet backing, and a plurality of stiff bristles having a spacing therebetween sufficient to allow the insertion of a floor carpet material in a frictional mesh engagement, wherein said stiff bristles are closely and densely packed, and are boar bristles.

2. A non-skid carpet protector adapted to be used on vehicle carpets including, in combination, a carpet backing of a desired shape and cross section, a separate layer of covering material of a complimentary shape attached to the top of said carpet backing, and a plurality of stiff bristles attached to the underside of said carpet backing, said bristles having a spacing therebetween sufficient to allow the insertion of a floor carpet material in a frictional mesh engagement, wherein said stiff bristles are closely and densely packed and are boar bristles, and wherein a rivet-type edge protector is provided around the perimeter thereof.

3. The device defined in any one of claims 1 or 2, wherein said carpet protector is a mat construction.

4. The device defined in any one of claims 1 or 2, wherein said carpet protector is a heel pad construction.

5. The device defined in any one of claims 1 or 2, wherein said carpet protector is adapted to cover the entire front floor area.

* * * * *